Feb. 25, 1964  A. BENDITT ETAL  3,122,392
CARTRIDGE OPERATED PARACHUTE RELEASE MECHANISM
Filed Dec. 14, 1962
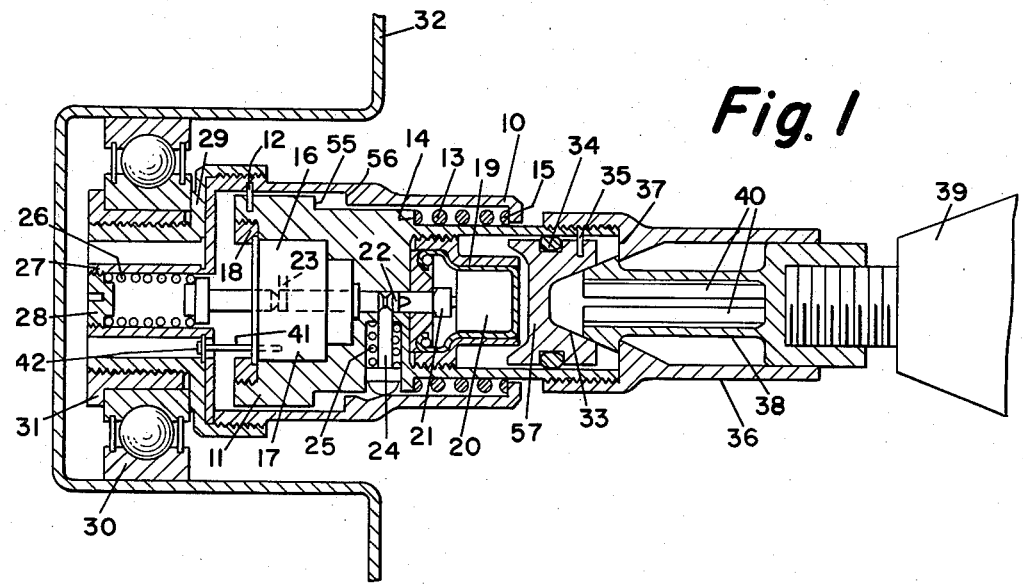
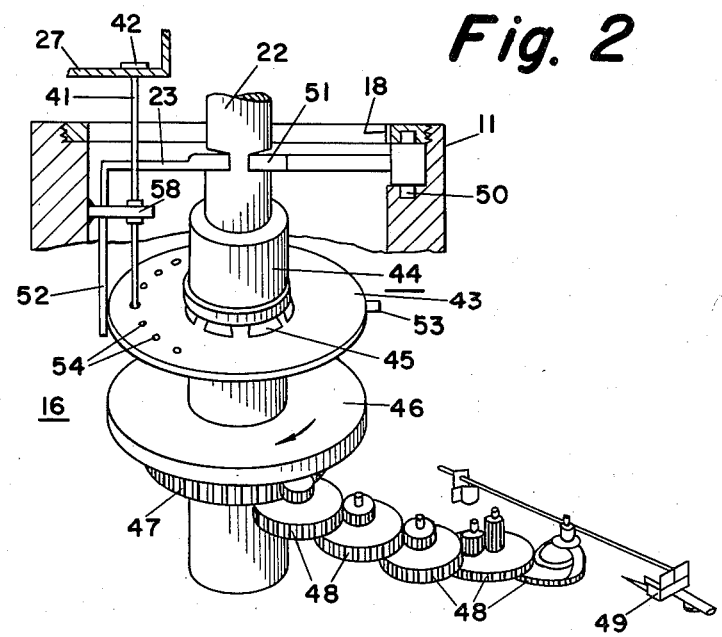
INVENTORS:
ALBERT BENDITT
ALBERT M. STOTT
BY S. J. Rotondi, A. J. Dupont & S. Dubroff
ATTORNEYS United States Patent Office 3,122,392
Patented Feb. 25, 1964

3,122,392
CARTRIDGE OPERATED PARACHUTE RELEASE
MECHANISM
Albert Benditt, Philadelphia, and Albert M. Stott, Aldan-Clifton Heights, Pa., assignors to the United States of America as represented by the Secretary of the Army
Filed Dec. 14, 1962, Ser. No. 244,845
2 Claims. (Cl. 294—83)
(Granted under Title 35, U.S. Code (1952), sec. 266)

The invention described herein may be manufactured and used by or for the Government for governmental purposes without the payment to us of any royalty thereon.

This invention relates to cartridge operated parachute release mechanisms. It provides an improved means for preventing faulty or premature operation due to momentary decreases in the load supported by the parachute. It is herein described as utilized in connection with launching of a torpedo into the water. Other uses of the mechanism will be apparent to those skilled in the art.

Inertially operated mechanisms have been utilized heretofore to disengage a torpedo from a parachute upon the torpedo's contact with the water. While such inertially operated devices operate satisfactorily when the torpedo strikes the water at an angle sufficient to enable them to function, there is no assurance that the torpedo will strike the water at any particular angle. As a result, it sometimes happens that the parachute is not separated from the torpedo. The present invention provides an improved means for ensuring the parachute is detached from the torpedo regardless of the angle at which the torpedo strikes the water. As will appear, an important feature of this improved means is a mechanical timer which is set into motion upon the application of the load to the parachute and functions to lock the firing pin in a retracted position for a predetermined time thereafter.

The invention will be better understood from the following description when considered in connection with the accompanying drawings and its scope is indicated by the appended claims.

Referring to the drawings:

FIG. 1 is a sectional view of the release mechanism, and

FIG. 2 illustrates the relation between certain features of the mechanical timer.

The release mechanism of FIG. 1 includes an outer housing 10 and an inner housing 11 which are interlocked by a shear pin 12 and are urged apart by a spring 13 mounted between their opposed shoulders 14 and 15. A mechanical timer 16 is maintained in a recess 17 at one end of the inner housing 11 by means of a lock nut 18. Threaded into the other end of the inner housing 11 is a collar 19 within which is supported a cartridge 20 having a primer 21. A firing pin 22 is maintained in its illustrated cocked position by a pair of sears 23 and 24. The sear 23 is controlled by the timer 16 as hereinafter explained in connection with FIG. 2. The sear 24 is urged away from the firing pin 22 by a spring 25 upon expansion of the spring 13 and further separation of the shoulders 14 and 15.

A firing pin spring 26 is enclosed in a housing 27 and is held against the end of the firing pin by a plug 28. The firing pin housing 27 is clamped against the end of the outer housing 10 by means of a bearing clamp 29 which is threaded onto the end of the housing 10. A bearing 30 is held between the clamp 29 and a clamp 31 and is attached to a metal disk 32 of the parachute (not shown).

A piston 57 encircled by a seal ring 34 is movable within the inner housing 11 and is attached to this housing by a shear pin 35. A collet support 36, threaded onto the end of the inner housing 11, has an inner shoulder 37 and supports a collet 38 into one end of which is threaded the shaft of a torpedo 39. The collet 38 has a plurality of tines 40 with sloping surfaces in engagement with corresponding surfaces 33 of the piston 57. When the piston 57 is moved away from the cartridge 20, these tines are forced inwardly and the torpedo is released.

In its standby condition, the mechanical timer is locked against movement by an actuating pin 41. As indicated by FIG. 2 the pin 41 has a head 42 in engagement with the housing 27 and extends therethrough into engagement with a timing disk 43. The timing disk 43 is attached to a hollow shaft 44 by means of a Belleville clutch 45. The shaft 44 rotates about the firing pin 22 and has fixed to it a main spring 46 and a gear 47. This gear is driven by the main spring 46 under the control of a gear train 48 and an escapement 49 geared thereto. The sear 23 is rotatable about a pivot 50, and has intermediate its ends a fork 51 which fits into a recessed section of the firing pin 22 and has at its free end a tang 52 adapted to engage an extension 53 on the perimeter of the disk 43. The disk 43 has a plurality of holes 54 for setting the timer to run for different time periods before the sear 23 is disengaged from the firing pin. The actuating pin 41 extends through a guide member 58 which grips the pin with sufficient friction to maintain it in any position to which it is raised by the housing 27.

When the parachute opens and the initial load is applied the pin 12 is sheared and the spring 13 is compressed until the shoulders 55 and 56 of the housings 10 and 11 are engaged. This disengages the actuating pin 41 from the disk 43 and permits the timer to start. The pin 41 is thereafter maintained in its disengaged position by friction between it and the guide member 58. Any momentary decrease in the load, such as that occasioned by resiliency of the parachute shroud lines, may permit the spring 13 to expand to a point where the sear 24 is disengaged from the firing pin 22. However, the firing pin is still locked stationary by the sear 23. Reapplication of the load before the time delay has expired bring the shoulders 55—56 into engagement and returns the sear 24 to locking engagement with the firing pin 22.

When the pre-set time has elapsed and the torpedo strikes the water, the load on the parachute is released, the spring 13 urges the shoulders 55 and 56 to separate and the sear 24 is disengaged from the firing pin 22 by the spring 25. This releases the firing pin so that it is driven by the compressed spring 26 against the primer 21 thus firing the cartridge 20. The gas pressure generated by the firing of the cartridge drives the piston 57 against the collet 38 bending the tines 40 inwardly and disengaging the collet and torpedo from the collet support 36.

As previously indicated, the extent of the time delay interval is determined by adjusting the angular relation between the extension (53) and the tang 52, this adjustment being effected through the Belleville coupling 45 between the hollow shaft 44 and the timing disk 43. The delay time will not ordinarily exceed two seconds to permit launching at low altitudes. However, since the time delay can be accurately adjusted from relatively short to comparatively long delay times without replacing the cartridge, the altitude of the launch can be changed to suit the tactical mission. Also, objects other than torpedoes may be released by this device.

It is to be noted that the mechanical time delay has been designed integral with the firing section of the release, and is provided with safety linkage to prevent premature function.

We claim:

1. In a mechanism for releasing a load from a parachute, the combination therewith of
    an outer housing permanently connected to said parachute and having an internal shoulder, an inner housing detachably connected to said load and having an external shoulder alined with said internal shoulder, said inner housing having at one end a recess enclosing a timer and at the other end a recess enclosing means supporting a cartridge, resilient means urging said shoulders apart, a shear pin interlocking said housings with a predetermined spacing between said shoulders, a firing pin extending through said timer in alinement with said cartridge, means for effecting movement of said firing pin, a first sear detachable from said firing pin by said timer with a predetermined time delay following the application of the force of said load to said parachute and the severing of said shear pin, means for starting said timer upon the application of said force, a second sear operable upon the termination of said force to release said firing pin for firing said cartridge and generating a gas pressure, in said inner housing, and means operated by said gas pressure to detach said load from said inner housing.

2. In a mechanism for releasing a load from a parachute, the combination therewith of an outer housing permanently connected to said parachute and having an internal shoulder, an inner housing detachably connected to said load and having an external shoulder alined with said internal shoulder, said inner housing having at one end a recess enclosing a timer and at the other end a recess enclosing means supporting a cartridge, resilient means urging said shoulders apart, a shear pin interlocking said housings with a predetermined spacing between said shoulders, a firing pin alined with said cartridge, means for effecting movement of said firing pin, a first sear detachable from said firing pin by said timer with a predetermined time delay following the application of the force of said load to said parachute and the severing of said shear pin, means for starting said timer upon the application of said force, a second sear operable upon the termination of said force to release said firing pin for firing said cartridge and generating a gas pressure, in said inner housing, and means operated by said gas pressure to detach said load from said inner housing.

References Cited in the file of this patent
UNITED STATES PATENTS

| | | |
|---|---|---|
| 2,650,127 | Carlson | Aug. 25, 1953 |
| 2,942,911 | Stott | June 28, 1960 |